Jan. 19, 1932.  W. S. EATON  1,842,341
APPARATUS FOR CONVERTING OR TRANSFORMING ELECTRICAL ENERGY
Filed Nov. 28, 1928
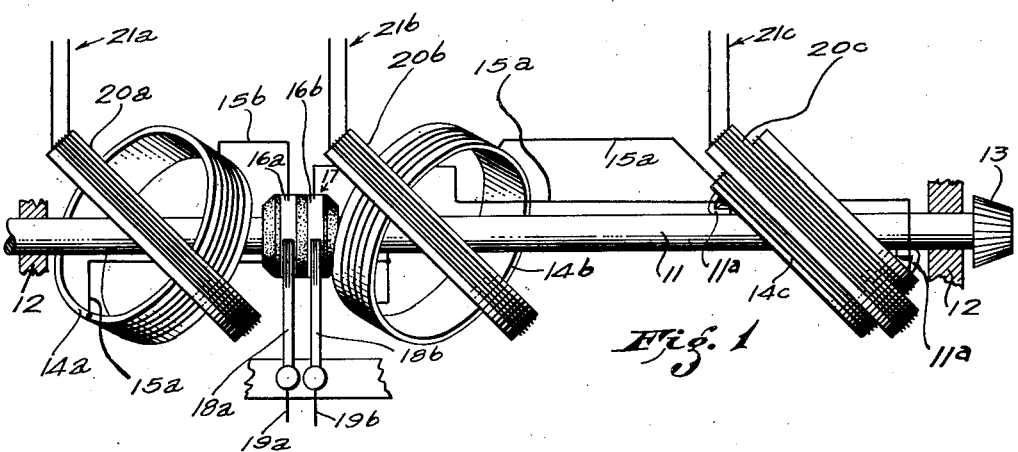
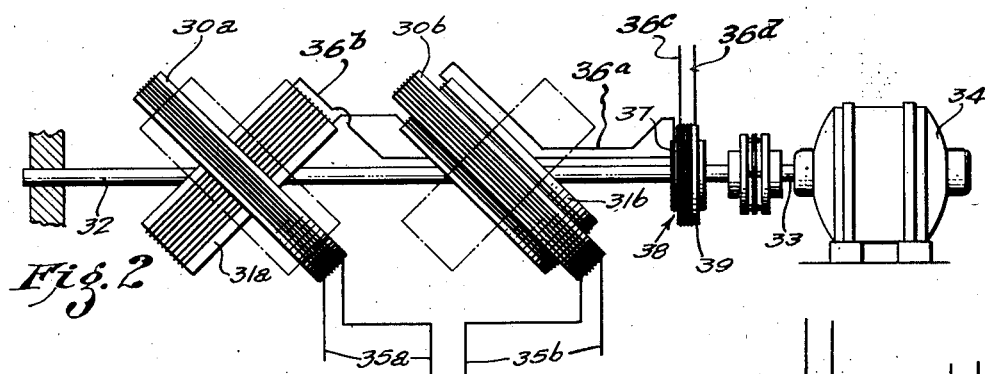
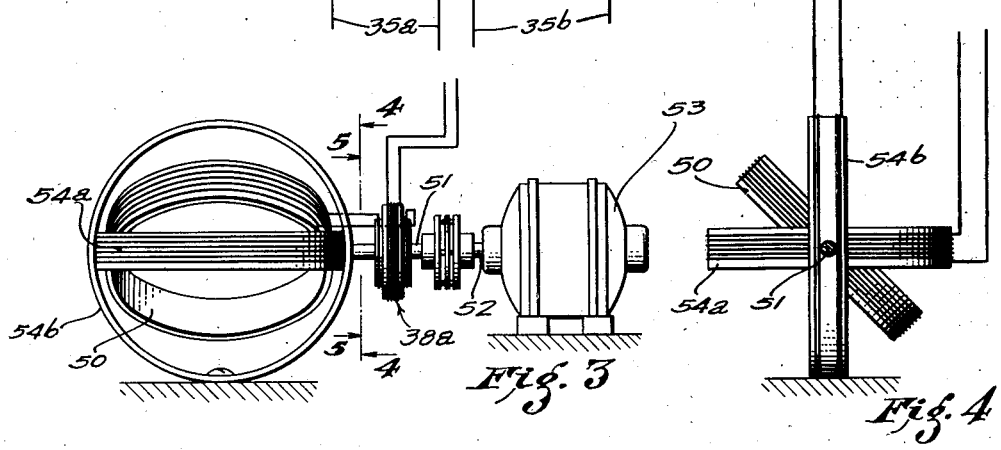
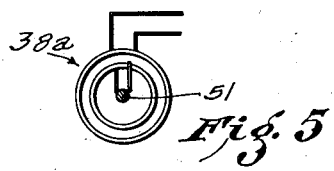
INVENTOR.
Warren S. Eaton
BY
ATTORNEYS.

Patented Jan. 19, 1932

1,842,341

UNITED STATES PATENT OFFICE

WARREN S. EATON, OF LOS ANGELES, CALIFORNIA, ASSIGNOR, BY MESNE ASSIGNMENTS, TO EATON RADIO INSTRUMENT CORPORATION, OF LOS ANGELES, CALIFORNIA, A CORPORATION

APPARATUS FOR CONVERTING OR TRANSFORMING ELECTRICAL ENERGY

Application filed November 28, 1928. Serial No. 322,336.

This invention is for converting or transforming electric current and has been produced particularly for use in connection with a radio direction indicator of special type and design, the subject of another application for patent.

It is a primary object of this invention to provide an apparatus which will receive electrical excitation from a plurality of sources and will resolve the same into a single resultant current, the value of which is a pulsating means of the currents supplied to the apparatus.

As was indicated above, this device has been developed primarily for use in connection with a radio direction indicator in which a plurality of loop radio antennæ are arranged in fixed angular relation with each other and are separately connected to primary inductance coils on the apparatus, the primary inductance coils being circumscribed about rotating secondary coils which are connected in series and are disposed in fixed angular relation to each other, such angular relation corresponding to the angular disposition of the radio antenna which comprises the plurality of electrical excitations mentioned above.

A further object of this invention is to produce an apparatus which may be used to resolve a single alternating current into a plurality of pulsating currents.

It is also an object of the invention to produce a construction which may be employed for the purpose of varying the frequency of an alternating current.

The means through which the above enumerated objects of this invention may be accomplished are illustrated in more or less diagrammatic form in the accompanying drawings which are chosen for illustrative purposes only and in which Fig. 1 is an elevational view showing an organization embodying the features of the present invention.

Fig. 2 is an elevational view of a modified form of an organization similar to that shown in Fig. 1.

Fig. 3 is an elevational view showing a modified construction in which a single rotating coil is employed in combination with two fixed coils, all of the coils being mounted upon a common axis.

Fig. 4 is an elevational section taken substantially in plane represented by the line 4—4 in Fig. 3 more clearly illustrating the manner in which the coils are arranged and indicates diagrammatically the electrical connections between the outside coils.

Fig. 5 is an elevational section taken substantially in a plane and in the direction indicated by the arrows 5—5 in Fig. 3.

More particularly describing the invention as herein illustrated with specific reference to Fig. 1, reference numeral 11 indicates a shaft supported by bearings 12 and adapted to receive rotation from any source such as the friction cone 13. The friction cone 13 may be driven in any preferred manner such as by means of an electric or air driven motor (not shown).

Mounted upon the shaft 11 in fixed angular relation with each other, are a plurality of inductance coils indicated at 14a, 14b and 14c. These coils are diametrically mounted upon the shaft 11 and are disposed at angles of substantially 120° relative to each other, and may be connected to the shaft 11 in any suitable manner, as for instance by means of brackets 11a as shown in connection with inductance coil 14c in Fig. 1 of the drawings.

All of the coils are connected in series by means of conductors 15a and 15b, such conductors being connected with the slip rings 16a and 16b embodied in a slip ring commutator 17 which is mounted upon the shaft 11. The rings 16a and 16b are in turn in engagement with brushes 18a and 18b which are connected with conductors 19a and 19b.

A plurality of fixed inductance coils are diametrically disposed with the shaft 11 in parallel relation with each other and these coils circumscribe the rotating coils 14a, 14b and 14c. The fixed inductance coils are indicated by reference numerals 20a, 20b and 20c.

As was previously pointed out, these fixed inductance coils may receive electrical excitation from a plurality of sources such as three radio antenna coils (not shown) which are angularly disposed with each other in a manner such that an induced current of different magnitude is introduced into each of the coils 20a, 20b and 20c through the conductors indicated at 21a, 21b and 21c respectively.

It will be apparent from this construction that if three electric currents of different characteristics are introduced into the three fixed inductance coils 20a, 20b and 20c, through the conductors 21a, 21b and 21c respectively, that a different field of force will be set up about each of the mentioned coils. If the shaft 11 is now rotated, it will also be apparent that for one-third of each revolution, a current will be induced in each of the coils 14a, 14b and 14c which corresponds in its characteristics with the current supplied to the corresponding fixed inductance coil.

The intensity of each of these currents will have a maximum value when the coils are in the relative position of coils 14c and 20c and will have a decreased value when the coils are in the position of coils 14a and 20a, and 14b and 20b respectively. The current in each coil 14a, 14b and 14c has a maximum and a zero value once each revolution, the maximum pulsations between the three coils are 120° apart and the zero value for each coil is attained when the rotating coil is at right angles to the fixed coil which surrounds it.

It will be understood therefore that during the rotation of the shaft 11 a varying current may be taken from the slip ring commutator 17, the value of the current varying during each revolution with the respective values of the current in the inductance coils 20a to 20c respectively.

It will also be apparent that characteristics of the current taken from the slip ring commutator 17 will be the arithmetic mean of the characteristics of the three excitation currents delivered to the coils 20a 20b and 20c the "mean" current being of a pulsating nature.

Fig. 2 illustrates a construction similar to that shown in Fig. 1 in which two fixed inductance coils 30a and 30b are used instead of the three coils 20a, 20b and 20c. In this embodiment of the invention the two rotating inductance coils 31a and 31b are mounted upon a rotating shaft 32 and are disposed at substantially 180° with each other. These coils are circumscribed by the fixed coils 30a and 30b and are adapted to receive rotation in any preferred manner.

The shaft 32 is directly connected with the rotor shaft 33 of a motor 34. It will be understood that if alternating currents of different characteristics are being supplied to the coils 30a and 30b through conductors 35a and 35b, the construction shown in Fig. 2 will operate the same as that shown and described in connection with Fig. 1.

A pulsating alternating current will be withdrawn through conductors 36a and 36b which are connected with a primary coil 37 of an inductance transformer generally indicated at 38 and thence through conductors 36c and 36d. The transformer 38 comprises the rotating inductance coil 37 and a fixed inductance coil 39 which is concentric with and circumscribed about the rotating inductance coil 37, both of these coils being in a plane at right angles to the shaft 32.

Fig. 3 shows a modified form of construction which is similar in its operation to that shown in Fig. 2. This construction embodies a single rotating inductance coil 50, which is mounted upon a rotor shaft 51, the shaft being connected with a shaft 52 of a motor 53.

Fixed inductance coils indicated at 54a and 54b are disposed at substantially 90° with each other and are mounted on a common diameter with the rotating inductance coil 50.

It will also be understood that a single alternating or direct current may be introduced into the apparatus of the present invention in a manner reverse to that hereinbefore described, i. e., the current may be introduced into the moving coils, and pulsating currents taken off from the fixed coils, the frequency of the pulsations in the resulting currents being governed by the speed of rotation of the moving coils.

As hereinbefore stated, the present invention has been designed for use in connection with directive radio reception wherein a plurality of loop radio antennæ are arranged in fixed angular relation with each other so as to receive radiant energy in different amounts, and the apparatus is designed to utilize these different amounts of energy to create pulsating electric current.

While rotative movement of the windings is described and shown in the drawings for varying the mutual inductance of the windings, the important thing is to vary the mutual inductance, and therefore it will be understood that I do not limit myself to rotative movement, as movement of any character which will vary the mutual inductance of the windings is within the scope of my invention.

I claim as my invention:

1. An apparatus for transforming electric energy embodying: a continuously rotating shaft; a plurality of inductance coils longitudinally spaced on said shaft and diametrically mounted thereon in fixed angular relation with each other to rotate with said shaft; fixed inductance coils, each of which circumscribes one of said rotating inductance coils; means for electrically exciting each of said fixed coils from a separate source of energy; and means for conducting a resultant flow of current from said rotating coils during the rotation of said shaft.

2. An apparatus for transforming electric energy embodying: a continuously rotating shaft; a plurality of inductance coils longitudinally spaced on said shaft and diametrically mounted thereon in fixed angular relation with each other to rotate with said shaft; fixed inductance coils, each of which circumscribes one of said rotating inductance coils; means for electrically exciting each of said fixed coils from a separate source of energy; a primary inductance coil mounted on said shaft at right angles thereto to receive excitation from said rotating coils; and a secondary inductance coil concentric with and circumscribing said primary inductance coil to receive induced current therefrom.

3. An apparatus for transforming electric energy embodying: a continuously rotating shaft; a plurality of inductance coils longitudinally spaced on said shaft and diametrically mounted thereon in fixed angular relation with each other to rotate with said shaft; fixed inductance coils, each of which circumscribes one of said rotating inductance coils; means for electrically exciting each of said fixed coils from a separate source of energy; and means for conducting a resultant flow of current from said rotating coils during the rotation of said shaft, said rotating coils being disposed in equal angular relation with each other.

4. An apparatus for transforming electrical energy embodying, a continuously rotating shaft, a set of inductance coils longitudinally spaced on said shaft and diametrically mounted thereon in fixed angular relation with each other to rotate with said shaft, a set of fixed inductance coils each of which circumscribes one of said rotating inductance coils, means for electrically exciting each of the coils of one of said sets of coils from separate sources of energy, and means for conducting a resultant flow of current from the other set of coils.

5. An apparatus for transforming electrical energy embodying, a continuously rotating shaft, a set of inductance coils longitudinally spaced on said shaft and diametrically mounted thereon in fixed angular relation with each other to rotate with said shaft, a set of fixed inductance coils, each of which circumscribes one of said rotating inductance coils, means for electrically exciting one of said sets of coils, and means for conducting resultant flow of current from the other set of coils.

6. An apparatus for transforming electrical energy, comprising primary inductance means, secondary inductance means, one of said means including a plurality of inductance units, means for consecutively and continuously varying the respective inductive relations between the units and said other means, and means for conducting induced pulsating current from said secondary means.

7. An apparatus for transforming electrical energy comprising primary inductance means, secondary inductance means, the primary means including a plurality of inductance units, means for consecutively and continuously varying the respective inductive relations between the primary units and secondary means, and means for conducting a single induced pulsating current from said secondary means.

8. An apparatus for transforming electrical energy, comprising primary inductance means, secondary inductance means, the secondary means including a plurality of inductance units, means for consecutively and continuously varying the respective inductive relations between the primary means and secondary units, and means for conducting a plurality of induced pulsating currents from said secondary means.

9. An apparatus for transforming electrical energy, comprising primary inductance means, secondary inductance means, one of said means including a plurality of inductance units, means for consecutively and continuously varying the respective inductive relations between the units and said other means from a minimum to a maximum, and means for conducting induced pulsating current from said secondary means.

10. An apparatus for transforming electrical energy, comprising primary inductance means, secondary inductance means, each of said means including a plurality of inductance units, means for consecutively and continuously varying the respective inductive relations between the primary units and secondary units, and means for conducting induced pulsating current from said secondary means.

11. An apparatus for transforming electrical energy, comprising primary inductance means, secondary inductance means, each of said means including a plurality of inductance units, means for consecutively and continuously varying the respective inductive relations between the primary units and secondary units, and means for conducting a single induced pulsating current from said secondary means.

12. An apparatus for transforming electrical energy, comprising primary inductance means, secondary inductance means, each of said means including a plurality of inductance units, means for consecutively and continuously varying the respective inductive relations between the primary units and secondary units, and means for conducting a plurality of separate currents from said secondary means.

13. An apparatus for transforming electrical energy, comprising primary inductance means, secondary inductance means, each of said means including a plurality of inductance units, means for consecutively and continuously varying the respective inductive relations between the primary units and secondary units from a minimum to a maximum, and means for conducting induced pulsating current from said secondary means.

14. An apparatus for transforming electrical energy, comprising a set of primary windings, means for electrically exciting said windings, a set of secondary windings, means for consecutively and continuously varying the respective inductive relations between the primary windings and secondary windings, and means for conducting induced pulsating current from said secondary windings.

15. An apparatus for transforming electrical energy, comprising a set of primary windings, means for electrically exciting said windings separately, a set of secondary windings, means for consecutively and continuously varying the respective inductive relations between the primary windings and secondary windings, and means including series connection of the secondary windings for conducting a single induced pulsating current from said secondary windings.

16. An apparatus for transforming electrical energy, comprising a set of primary windings, means for electrically exciting said windings, a set of said secondary windings, means for consecutively and continuously varying the respective inductive relations between the primary windings and secondary windings, and means for conducting a plurality of induced pulsating currents from said secondary windings.

17. An apparatus for transforming electrical energy, comprising a plurality of separate fixed inductance means, a single movable inductance means, means for electrically exciting one of said inductance means, means for actuating the movable inductance means for consecutively and continuously varying the respective inductive relations between the fixed and movable inductance means, and means for conducting induced pulsating current from the other of said inductance means.

18. An apparatus for transforming electrical energy, comprising a plurality of separate fixed inductance means, a single rotatable inductance means, means for electrically exciting one of said inductance means, means for actuating the rotatable inductance means for consecutively and continuously varying the respective inductive relations between the fixed and rotatable inductance means, and means for conducting induced pulsating current from the other of said inductance means.

19. An apparatus for transforming electrical energy, comprising a set of fixed inductances disposed in spaced relation along a longitudinal axis, another set of inductances mounted for movement into and out of inductive relation with said fixed inductances, means for consecutively and continuously moving said other set of inductances for varying the respective inductive relations between the fixed and movable inductances, means for electrically exciting one of said sets of inductances, and means for conducting a resultant current from the other set of inductances.

In testimony whereof, I have hereunto set my hand at Los Angeles, California, this 10th day of November, 1928.

WARREN S. EATON.